(12) United States Patent
Garcia et al.

(10) Patent No.: US 11,237,448 B2
(45) Date of Patent: Feb. 1, 2022

(54) HYBRID ELECTROCHROMIC DEVICES AND METHODS

(71) Applicant: HELIOTROPE TECHNOLOGIES, INC., Alameda, CA (US)

(72) Inventors: Guillermo Garcia, Oakland, CA (US); Amir Bayati, Santa Clara, CA (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 324 days.

(21) Appl. No.: 16/391,564

(22) Filed: Apr. 23, 2019

(65) Prior Publication Data

US 2019/0324339 A1 Oct. 24, 2019

Related U.S. Application Data

(60) Provisional application No. 62/661,721, filed on Apr. 24, 2018.

(51) Int. Cl.
| | |
|---|---|
| *G02F 1/155* | (2006.01) |
| *G02F 1/1523* | (2019.01) |
| *B60J 3/04* | (2006.01) |
| *B60J 7/043* | (2006.01) |

(52) U.S. Cl.
CPC .............. *G02F 1/155* (2013.01); *B60J 3/04* (2013.01); *G02F 1/1523* (2013.01); *G02F 1/1525* (2013.01); *B60J 7/043* (2013.01); *G02F 2001/1555* (2013.01); *G02F 2202/36* (2013.01)

(58) Field of Classification Search
CPC . B60J 3/04; B60J 7/043; G02F 1/1523; G02F 1/1525; G02F 1/155; G02F 1/163; G02F 2001/1555; G02F 2202/36; E06B 2009/2464; E06B 9/24
See application file for complete search history.

(56) References Cited

U.S. PATENT DOCUMENTS

| | | | |
|---|---|---|---|
| 4,902,108 A | 2/1990 | Byker | |
| 9,864,250 B2 * | 1/2018 | Garcia | .......... C03B 27/00 |
| 2008/0316574 A1 | 12/2008 | Baumann et al. | |
| 2016/0306251 A1 * | 10/2016 | Yamamoto | .......... G09G 3/2014 |
| 2018/0364540 A1 | 12/2018 | Winoto et al. | |

* cited by examiner

*Primary Examiner* — Joseph P Martinez
*Assistant Examiner* — Vipin Patel
(74) *Attorney, Agent, or Firm* — The Marbury Law Group PLLC

(57) ABSTRACT

An electrochromic (EC) device and method of operating the same, the EC device including a transparent substrate, a working electrode disposed on the substrate and including electrochromic inorganic nanoparticles, a counter electrode, and an electrolyte disposed between the working electrode and the counter electrode, the electrolyte including an electrochromic organic material.

3 Claims, 2 Drawing Sheets

HYBRID ELECTROCHROMIC DEVICES AND METHODS

FIELD

The present invention is generally directed to electrochromic (EC) devices and methods of operating the same, and in particular, to hybrid EC devices including organic and inorganic electrochromic materials.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use.

Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Some EC devices may include a working electrode, a solid state electrolyte, and a counter electrode sandwiched between two transparent conductor layers and an outer glass layer. The working electrode may include a metal oxide active material.

SUMMARY OF THE INVENTION

According to various embodiments, provided is an electrochromic (EC) device comprising a transparent substrate, a working electrode disposed on the substrate and including electrochromic inorganic nanoparticles, a counter electrode, and an electrolyte disposed between the working electrode and the counter electrode, the electrolyte including an electrochromic organic material.

According to various embodiments, provided is a method of operating an electrochromic (EC) device comprising: transparent substrate, a working electrode disposed on the substrate and including electrochromic inorganic nanoparticles, a counter electrode, and an electrolyte disposed between the working electrode and the counter electrode, the electrolyte including an electrochromic organic material, the method comprising: supplying power to the EC device to form a first voltage potential difference between the working and counter electrodes, such that the organic material switches from a bright state to a dark state within a first time period, and such that the nanoparticles switch from a bright state to a dark state within a second time period; and stopping the supply of power to the EC device, such that the organic material switches back to the bright state and the nanoparticles remain in the dark state.

DETAILED DESCRIPTION OF THE EXEMPLARY EMBODIMENTS

Figure 1:
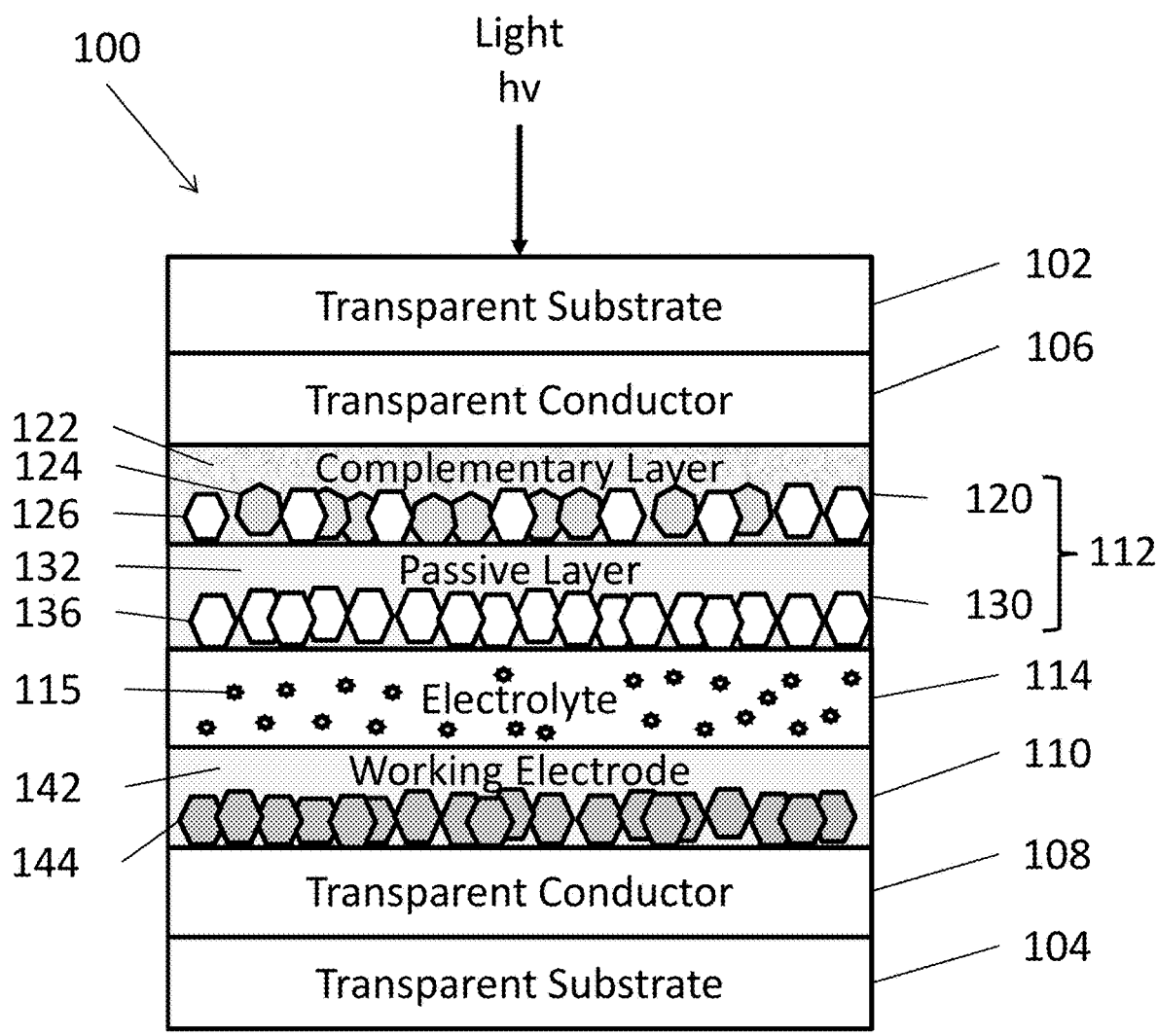
FIG. 1 is a schematic representation of an EC device, according to various embodiments of the present disclosure.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

FIG. 1 is schematic view of an EC device 100, according to various embodiments of the present disclosure. It should be noted that the thickness of the layers and/or size of the components of the devices in FIG. 1 are not drawn to scale or in actual proportion to one another other, but rather are shown as representations.

Referring to FIG. 1, the EC device 100 may include opposing first and second substrates 102, 104. The first and second substrates 102, 104 may be transparent substrates, such as substrates formed of optically transparent glass or plastic. However, in some embodiments, the substrates 102, 104 may be omitted. For example, the EC device 100 may refer to a coating formed of the various layers of FIG. 1 that are disposed between the substrates 102, 104.

First and second transparent conductors 106, 108 may be respectively disposed on the first and second substrates 102, 104. A counter electrode 112 may be disposed on the first transparent conductor 106, and a working electrode 110 may be disposed on the second transparent conductor 108. An electrolyte 114 may be disposed on between the working electrode 110 and the counter electrode 112.

The first and second transparent conductors 106, 108 may be formed from transparent conducting films fabricated using inorganic and/or organic materials. For example, the transparent conductors 106, 108 may include inorganic films of transparent conducting oxide (TCO) materials, such as indium tin oxide (ITO) or fluorine doped tin oxide (FTO). In other examples, organic films of transparent conductors 106, 108 may include graphene and/or various polymers.

Counter Electrodes

The counter electrode 112 should be capable of storing enough charge to sufficiently balance the charge needed to cause visible tinting to the nanostructured transition metal oxide nanostructures in the working electrode 110. In various embodiments, the counter electrode 112 may be formed as a conventional, single component film, a multilayer film, a nanostructured film, or a nanocomposite layer.

In some embodiments, the counter electrode 112 may include a complementary layer 120 and a passive layer 130. The complementary layer 120 may include metal oxide nanoparticles disposed in a metal oxide matrix 122. In various embodiments, the complementary layer 120 may optionally include a flux material, as discussed in detail below with regard to the passive layer 130. As used herein, the term "nanoparticle" includes any suitable nanoparticle shape, such as a sphere, rod (e.g., nanorod or nanowire), a three dimensional polygon and/or an irregular shape.

The matrix 122 may be formed of a lithium metal oxide. For example, the matrix 122 may be formed of $LiNbO_3$ (lithium niobate), $Li_2WO_4$ (lithium tungstate), $LiTaO_3$ (lithium tantalite), combinations thereof, or the like.

The nanoparticles may include complementary nanoparticles 124 comprising at least one complementary (e.g., color balancing) material, which may be transparent to NIR radiation, but which may be oxidized in response to application of a bias, thereby causing absorption of visible light radiation. Examples of such complementary counter electrode materials may include nickel oxide (e.g., $NiO_x$, where $1 \leq x \leq 1.5$ such as NiO), $Cr_2O_3$, $MnO_2$, $FeO_2$, $CoO_2$, $RhO_2$, or $IrO_2$.

In some embodiments, the complementary layer 120 may include passive nanoparticles 126 comprising at least one passive material that is optically transparent to both visible and NIR radiation during the applied biases. The passive nanoparticles 126 may operate as conductivity enhancer.

Examples of passive nanoparticles 126 may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof.

In some embodiments, the complementary layer 120 may include NiO complementary nanoparticles 124 and $In_2O_3$ passive nanoparticles 126 disposed in a $LiNbO_3$ matrix 122. The complementary layer 120 may also optionally comprise a flux material comprising a LiRAP material, as described below.

The passive layer 130 may include mixture of a flux material 132 and passive nanoparticles 136. Herein, when a flux material is included in a component of the EC device 100, the flux material may form a mixture with other elements of the component, such as nanoparticles, may form a coating on such nanoparticles (e.g., a core-shell structure), and/or may form a matrix in which nanoparticles are disposed. In some embodiments, the flux material and nanoparticles may be impregnated in a metal oxide matrix of a corresponding component.

The flux material 132 may comprise any suitable material that melts at a temperature that is lower than a sintering, crystallization, and/or phase transition temperature of metal oxide nanoparticles included in the EC device 100. For, example, the flux material 132 may have a melting temperature ranging from about 25° C. to about 500° C., such as from about 50° C. to about 450° C., or from about 100° C. to about 400° C. For example, the flux material 132 may be configured to melt when the EC device 100 is heated, such as during a tempering or heat-bending or heat-forming process applied to the EC device 100.

The flux material 132 may comprise a high-temperature stable material (e.g. an inorganic metal salt configured to suppress undesirable nanoparticle crystallization, sintering, and/or phase transitions of metal oxide nanoparticles during heating at temperatures of up to about 700° C.). Accordingly, the flux material 132 may be configured to protect the optical properties of the EC device during heat-bending and/or heat-treatment processes. The flux material 132 may be configured to solidify from a molten state, such as when the EC device 100 cools, without degrading the optical properties of the EC device 100.

In some embodiments, the flux material 132 may comprise a lithium salt material. For example, the flux material 132 may comprise a Li-rich anti-perovskite (LiRAP) material. An anti-perovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell.

According to various embodiments, the flux material 132 may include a LiRAP material having the formula $Li_3OX$, where X may be a halogen or a combination of halogens. For example, X may be F, Cl, Br, I, or any combination thereof. In some embodiments, the LiRAP material may be $Li_3OI$. In some embodiments, the LiRAP material may also include one or more dopant species. In some embodiments, the LiRAP material may be aliovalently doped by replacing a first anion in the base structure with a second anion that has a valence more positive than that of the first atom.

The LiRAP material of the flux material 132 may be formed from constituent lithium salts. For example, the LiRAP material may be formed from an oxygen-containing lithium salt and a halogen salt of lithium. Examples of the oxygen-containing lithium salt include lithium hydroxide (LiOH) lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or any combination thereof. Examples of the halogen salt of lithium include lithium chloride (LiCl), lithium bromide (LiBr), lithium fluoride (LiF), lithium iodide (LiI), or any combination thereof. In some embodiments, the LiRAP material may be formed from LiOH and LiI.

The passive nanoparticles 136 may comprise at least one passive material that is optically transparent to both visible and NIR radiation during the applied biases. Examples of such passive counter electrode materials may include $CeO_2$, $CeVO_4$, $TiO_2$, indium tin oxide (ITO), $In_2O_3$ (Indium(III) oxide), $SnO_2$ (tin(IV) dioxide), manganese or antimony doped tin oxide, aluminum doped zinc oxide, ZnO (zinc oxide), gallium zinc oxide, indium gallium zinc oxide (IGZO), molybdenum doped indium oxide, $Fe_2O_3$, $V_2O_5$, or mixtures thereof.

In some embodiments, passive layer 130 may include a mixture of $CeO_2$ and $In_2O_3$ passive nanoparticles 136 and a LiRAP flux material 132. The passive layer 130 may also optionally include a $LiNbO_3$ matrix (not shown) in which the passive nanoparticles 136 and the flux material 132 are disposed.

Working Electrodes

In various embodiments, the working electrode 110 may include a mixture of a flux material 142 and an electrochromic material comprising doped or undoped transition metal oxide nanoparticles 144. The working electrode 110 may optionally include a lithium metal oxide matrix (not shown) that may include any of the materials as described above with respect to the matrix 122.

The flux material 142 may include any of the materials described above with respect to the flux material 132. In one embodiment, the flux material 142 may be in the form of a matrix layer that surrounds the nanoparticles 144. In other embodiments, the flux material 142 may surround the nanoparticles 144 in a core-shell configuration, with the flux material 142 forming shells around nanoparticle cores.

In the various embodiments, the transition metal oxide nanoparticles 144 may be a ternary composition of the type AxMzOy, where M represents a transition metal ion species in at least one transition metal oxide, and A represents at least one optional dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the transition metal oxide nanoparticles may include doped or undoped $WO_{3-x}$, $Cs_xWO_{3-x}$, and/or $NbO_x$, nanoparticles, where $0 \leq x \leq 0.33$, such as $0 \leq x \leq 0.1$. Thus, when x=0, $WO_{3-x}$ is $WO_3$.

In various embodiments, the at least one optional dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanoparticle shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the electrolyte 114 and the transition metal oxide nanostructures of the working electrode 110, as a result of the applied voltage. Specifically, the application of voltage within the particular range may cause the second dopant species to intercalate and deintercalate the transition metal oxide nanostructures. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species. For example, if the transition metal oxide nanoparticles 144 are $WO_{3-X}$ nanoparticles, the dopant may be Li intercalated from the electrolyte 114.

In various embodiments, the shape, size, and doping levels of transition metal oxide nanoparticles 144 may be tuned to further contribute to the spectral response by the device. For instance, the use of rod versus spherical nanoparticles 144 may provide a wider level of porosity, which may enhance the switching kinetics. Further, a different range of dynamic plasmonic control may occur for nanostructures with multiple facets, such as at least 20 facets.

Various embodiments may also involve alternation of the nanoparticles 144 that form the working electrode 110. For example, the nanostructures may be nanoparticles of various shapes, sizes and/or other characteristics that may influence the absorption of NIR and/or visible light radiation. In some embodiments, the nanoparticles 144 may be isohedrons that have multiple facets, preferably at least 20 facets.

In some embodiments, the transition metal oxide nanoparticles 144 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 110. For example, the working electrode 110 may include both cubic and hexagonal cesium doped tungsten oxide bronze nanoparticles. In alternative embodiments, the working electrode 110 may include either cubic or hexagonal cesium doped tungsten oxide nanoparticles. For example, the working electrode 110 may include cubic cesium-doped tungsten oxide (e.g., $Cs_1W_2O_{6-X}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 110 may include undoped cubic tungsten oxide (e.g., $WO_{3-X}$) nanoparticles where $0 \leq X \leq 0.1$.

In some embodiments, at least one nanoparticle amorphous transition metal oxide may be included in the working electrode 110 in addition to the doped-transition metal oxide nanoparticles 144. An example of such material in the working electrode 110 may be, but is not limited to, nanostructured amorphous niobium oxide, such as NbO, $NbO_2$, or $Nb_2O_5$. In an alternative embodiment, the working electrode 110 may further include a matrix material, such as lithium niobate.

The nanoparticles 144 of the working electrode 110 may modulate transmittance of NIR and visible radiation as a function of applied voltage by operating in two different modes. For example, a first mode may be a highly solar transparent ("bright") mode in which the working electrode 110 is transparent to NIR radiation and visible light radiation. A second mode may be a visible blocking ("dark") mode in which the working electrode 110 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

Electrolyte

The electrolyte 114 of the hybrid device may include an ionically conducting component and an organic electrochromic component 115 that changes color (e.g., goes from bright to dark state and back) independent of the color change of the working electrode. The electrolyte may be in any suitable state, such as solid, liquid or gel state, According to various embodiments of the present disclosure, the term "gel", as used herein with respect to the electrolyte 114, refers to a substantially dilute cross-linked system that exhibits no flow when in the steady-state. By weight, a gel may be mostly liquid, but may behave like a solid due to a three-dimensional cross-linked network within the liquid. The crosslinking within the fluid may give a gel its structure (hardness) and contributes to the adhesive stick (tack).

In various embodiments, the electrolyte is a gel electrolyte 114 that may include a polymer network (e.g. backbone) and an ionically conducting phase disposed therein. The gel electrolyte 114 may optionally include at least one additive. The gel electrolyte 114 may have an electrical conductivity at room temperature ranging from about 1 µS/cm to about 10 mS/cm. The gel electrolyte 114 may have a modulus of elasticity that ranges from about 10 kPa to about 50 MPa. The gel electrolyte 114 may have shear strength when disposed on a transparent conductive oxide substrate that ranges from about 1 psi to about 1000 psi.

According to various embodiments, the polymer network may include crosslinked monomers and/or oligomers. Herein, "monomers" monomers refer to both monomers and oligomers. For example, the polymer network may include crosslinked structural monomers and adhesion promoting monomers (e.g., adhesion promoters). The ionically conductive phase may be disposed within the polymer network.

In some embodiments, the structural monomers may include polyurethane acrylate oligomers. The polyurethane acrylate may be formed from liquid polymer precursors, such as aliphatic ethers, aliphatic esters, aromatic ethers, and/or aromatic esters. In other embodiments, the polymer network may also include other structural monomers. For example, other structural monomers that may be included in the polymer network include, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), or the like.

The adhesion promoting monomers may include, for example, isobornyl acrylate (IBOA), ethoxylated nonylphenol acrylate, poly(ethylene glycol) diacrylate (PEGDA), trimethylolpropane triacrylate (TMPTA), ethoxyethoxyethyl acrylate, tripropylene glycol diacrylate (TPGDA), butyl acrylate (BA), hexanediol diacrylate (HDDA), and mixtures thereof. The adhesion promoting monomers may be configured to promote electrolyte adhesion between the structural monomers, and between the gel electrolyte 112 and an adjacent substrate, such as the working electrode 110 and/or the counter electrode 112.

The ionically conducting phase may include a plasticizer, an electrolyte salt, and/or an initiator. In some embodiments, the ionically conducting phase may include one or more optional additives, such as sacrificial redox agents (SRA).

In some embodiments, the plasticizer may include glymes (tetraglyme, triglyme, diglyme etc.), sulfolane, propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof. In an embodiment, the plasticizer may include at least one of tetraglyme and an alkyl hydroperoxide.

In various embodiments, the plasticizer may include an ionic liquid. The ionic liquid may include, for example, N-methyl-N-butylpyrrolidinium bis(trifluoromethylsulfonyl)imide (Py14TFSI), imidazolium bis(trifluoromethylsulfonyl)imide ([Im][TFSI]), or a combination thereof.

In some embodiments, the plasticizer may act as a solvent and/or may include an additional solvent. For example, the plasticizer may include tetraglyme, sulfolane, propylene carbonate, or mixtures thereof mixed with the ionic liquid. In some embodiments, the gel electrolyte 114 may initially contain an additional solvent, such as butanol, which may be evaporated off during assembly of, or after the electrochromic device is assembled.

In some embodiments, the electrolyte salt may contain, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, the electrolyte salt may contain a lithium salt and/or a sodium salt.

In various embodiments, the lithium salt may be, for example, lithium bis(trifluoromethanesulfonyl)imide (LiTFSI), lithium tetrafluoroborate (LiBF$_4$), lithium bis(oxalate)borate (LiBOB), lithium hexafluorophosphate (LiPF$_6$), lithium difluorooxalatoborate (LiDFOB), or mixtures thereof.

The ionically conductive phase may include an additive such as one or more SRAs. Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol, etc.), other substituted benzyl alcohols, indoline, 1,2,3,4-tetrahydrocarbazole, N,N-dimethylaniline, 2,5-dihydroanisole, methylthiol alcohol, or the like. In various embodiments, the SRA molecules may create an air stable layer that does not require an inert environment to maintain charge.

The gel electrolyte 114 may be formed by curing a gel electrolyte precursor composition. The gel electrolyte precursor composition, which may also be referred to as a "precursor composition", may be cured by the application of heat and/or UV light. Herein, the "gel electrolyte precursor composition" and "precursor composition" may refer to flowable liquid compositions that are not cross-linked, or are partially crosslinked (e.g., at least 50% of the crosslinkable polymers and/or oligomers remain un-crosslinked), but that may be cured to form a gel electrolyte.

The precursor composition may include polymer network precursors (e.g., structural monomers and adhesion promoting monomers used to form the polymer network) and an ionically conducting phase. The ionically conducting phase may include a plasticizer, an electrolyte salt, an initiator, optionally one or more additives, and any combinations thereof.

In various embodiments, the curing may be facilitated by the initiator. The initiator may include, for example, 2,2-Dimethoxy-2-phenylacetophenone, phenylphosphineoxide, benzoyl peroxide, or a mixture thereof.

In some embodiments, the precursor composition may include a viscosity controlling agent, such as a thickener, to increase the viscosity thereof. For example, the precursor composition may have a viscosity ranging from about 1,000 cP to about 90,000 cP, at room temperature. For example, the viscosity may range from about 10,000 cP to about 80,000 cP, such as from about 25,000 cP to about 60,000 cP.

For example, if the viscosity is less than about 1,000 cP, the thickness of the gel electrolyte 114 may be inconsistent. For example, the center of the electrolyte 114 may be thinner than edge regions of the electrolyte, which may complicate a subsequent lamination process using to construction an EC device 100, by forming gaps between the electrolyte and an adjacent substrate laminated thereto. On the other hand, when the viscosity is greater than about 90,000 cP, process bubbles in the electrolyte 114 may be difficult to remove and it may be difficult to apply a sealant around the electrolyte 114 during subsequent lamination processes.

Electrochromic Organic Materials

According to various embodiments of the present disclosure, the electrolyte 114 may also include one or more electrochromic organic materials 115. For example, the electrolyte 114 may include an organic anodic compound and/or an organic cathodic compound. The anodic compounds are electrochemically oxidized and the cathodic compounds are electrochemically reduced when a DC electrical potential difference is generated across the electrolyte between the electrodes 110, 112. The voltage potential difference may be about 2 volts or less, such as about 1.5 volts or less, about 1.2 volts or less, or about 1 volt or less. In some embodiments, a potential difference may range from about 0 volts to about 1.2 volts, for example.

Upon application of such a potential difference, the transmittance of the electrolyte 114 may change due to the anodic and/or cathodic compounds being oxidized and/or reduced. For example, the electrolyte 114 may change from clear to dark (e.g., may change from a bright state to a dark state) or may change color.

When an applied voltage potential difference is less than about 1.4 volts, such as between about 0.2 to about 1.4 volts, the electrolyte 114 may assume an intermediate state, wherein the electrolyte 114 transmits more light than in the dark state and less light than in the bright state. In other words, the electrochromic device 100 may be gray-scale controllable over a range of transmittance, by applying potential differences of between about 0.2 to about 1.4 volts.

In various embodiments, the cathodic electrochromic compound may comprise a viologen. Such viologens may be substituted or unsubstituted. Suitable cathodic electrochromic compounds may be represented by the following Formula I:

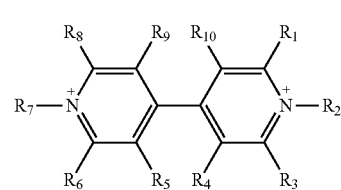

In Formula I, $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, 0, and/or S containing moiety, and/or one or more functional groups comprising alcohols, esters, ammonium salts, phosphonium salts, and combinations thereof; with the proviso that $R_2$ and $R_7$ each comprise at least two carbon atoms, at least one of $R_2$ and $R_7$ comprises less than 2β hydrogen atoms and is void of a benzyl group.

In one embodiment of the present invention, one or both of $R_2$ and $R_7$ is void of any β hydrogen atoms. Examples of such compounds include, but are not limited to 1,1'-di(neopentyl)-4,4'-dipyridinium bis(tetrafluoroborate), and 1,1'-di(1-adamantane methyl)-4,4'-dipyridinium bis(tetrafluoroborate). In another aspect of the present invention, one or both of $R_2$ and $R_7$ comprises less than 2β hydrogen atoms and is void of a benzyl group and consists and/or comprises an alkyl group containing approximately 5 to approximately 20 carbon atoms. An example of such a compound includes, but is not limited to 1,1'-di[2-(ethyl)hexyl]-4,4'-dipyridinium bis(tetrafluoroborate). Preferably, one or both of $R_2$ and $R_7$ comprises an electron-donating group pending from a β carbon atom. Examples of electron-donating groups include, but are not limited to, a hydroxyl group, a straight or branched alkyl group containing 1 to approximately 50 carbon atom(s), alcohols, amines, phosphines, ethers, esters, amides, nitrites, olefins, and combinations thereof.

In some embodiments, the cathodic electrochromic compounds may be represented by Formula II:

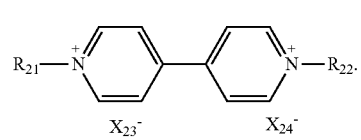

In Formula II, $R_{21}$ and $R_{22}$ are the same or different and are each selected from alkyl of 1 to 10 carbon atoms, phenyl optionally substituted at any one position with chloride, bromide, iodide, cyano, or an alkyl group of 1 to 4 carbon atoms, and benzyl, wherein the phenyl group is optionally substituted at any one position with chloride, bromide, iodide, cyano, or an alkyl group of 1 to 4 carbon atoms; and wherein $X_{23}^-$ and $X_{24}^-$ are the same or different and are each selected from chloride, bromide, iodide, $BF_4^-$, $PF_6^-$, $AsF_6^-$, $ClO_4^-$ and $NO_3^-$.

In some embodiments, suitable cathodic electrochromic compounds may be represented by Formula III:

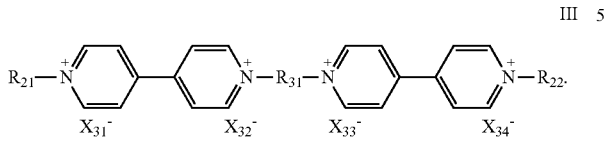

III

In Formula III, $R_{21}$ and $R_{22}$ are the same or different and are defined as above for the compound of Formula II, $R_{31}$ is alkylene of 1 to 10 carbon atoms, and $X_{31}^-$, $X_{32}^-$, $S_{33}^-$ and $X_{34}^-$ are the same or different and each selected from chloride, bromide, iodide, $BF_4^-$, $PF_6^-$, $AsF_6^-$, $ClO_4^-$ and $NO_3^-$.

In another embodiment, the cathodic electrochromic material includes an N,N'-dialkyldipyridinium compound. In another embodiment, at least one alkyl of the N,N'-dialkyldipyridinium includes at least four carbon atoms and less than two β hydrogen atoms. In another embodiment, at least one alkyl group attached to the dipyridinium compound is a (2-ethylhexyl) group. For example, the cathodic compound may be selected from 1,1'-dibenzyl-4,4'-bipyridinium difluoroborate, 1,1'-diphenyl-4,4'-bipyridinium difluoroborate, 1,1'-di(n-heptyl)-4,4'-bipyridinium difluoroborate, 1,1'-di(n-heptyl)-4,4'-bipyridinium diperchlorate, or mixtures thereof. In some embodiments, the viologen counter ion is any anion. In another embodiment, the counter ion is $BF_4$, $PF_6$, $SbF_6$, p-toluenesulfonate, trifluoromethansulfonate, or bis-trifluoromethanesulfonimide.

In various embodiments, the anodic compound may comprise an azine-containing compound. For example, the anodic compound may be selected from 5,10-dihydro-5,10-dimethylphenazine, 10-methylphenothiazine, 10-ethylphenoxazine, or mixtures thereof.

In various embodiments, the anodic electrochromic compound may comprise any one of a number of materials including azine-containing compounds. For example, the anodic compound may comprise ferrocene, substituted ferrocenes, substituted ferrocenyl salts, substituted phenazines, phenothiazine, substituted phenothiazines, thianthrene, and substituted thianthrenes.

Suitable anodic electrochromic compounds may be represented by Formula IV:

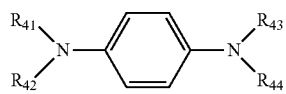

IV

In Formula IV, $R_{41}$, $R_{42}$, $R_{43}$ and $R_{44}$ are the same or different and are each selected from hydrogen, alkyl of 1 to 10 carbon atoms, phenyl optionally, substituted at any one position with chloride, bromide, iodide, cyano, or an alkyl group of 1 to 4 carbon atoms, and benzyl, wherein the phenyl moiety is optionally substituted at any one position with chloride, bromide, iodide, cyano, or an alkyl group of 1 to 4 carbon atoms.

In some embodiments, suitable anodic electrochromic compounds may be represented by Formula V:

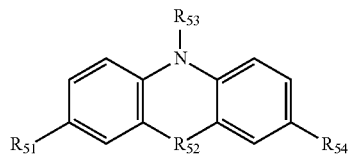

V

In Formula V, $R_{41}$, $R_{42}$, $R_{43}$ and $R_{44}$ are the same or different and are each selected from hydrogen, alkyl of 1 to 10 carbon atoms, phenyl optionally, substituted at any one position with chloride, bromide, iodide, cyano, or an alkyl group of 1 to 4 carbon atoms, and benzyl, wherein the phenyl moiety is optionally substituted at any one position with chloride, bromide, iodide, cyano, or an alkyl group of 1 to 4 carbon atoms.

In some embodiments, suitable anodic electrochromic compounds may be represented by Formula VI:

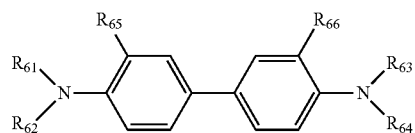

VI

In Formula VI, $R_{51}$ and $R_{54}$ are the same or different and are each selected from hydrogen and dialkylamino, wherein the alkyl groups are the same or different and are each of 1 to 6 carbon atoms; $R_{52}$ is oxygen, sulfur or $NR_{55}$, wherein $R_{55}$ is the same as or different from $R_{53}$ and both $R_{55}$ and $R_{53}$ are selected from hydrogen, alkyl of 1 to 10 carbon atoms, phenyl optionally substituted at any one position with chloride, bromide, iodide, cyano, or alkyl of 1 to 4 carbon atoms, or benzyl, optionally substituted at any one position of the phenyl group with chloride, bromide, iodide, cyano, or alkyl of 1 to 4 carbon atoms.

In some embodiments, suitable anodic electrochromic compounds may include tetrathiafulvalene represented by Formula VIII:

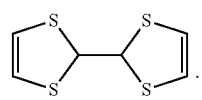

VIII

In some embodiments, suitable anodic electrochromic compounds may include compounds represented by Formula VII:

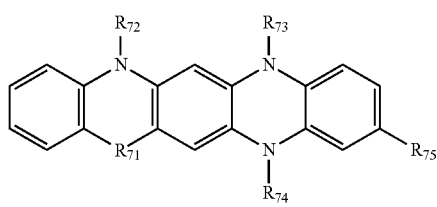

VII

In Formula VII, $R_{71}$ is oxygen or sulfur, $R_{75}$ is hydrogen or dialkylamino, wherein the alkyl groups are the same or different and are each selected from alkyl of 1 to 6 carbon atoms, and $R_{72}$, $R_{73}$ and $R_{74}$ are the same or different and are each selected from hydrogen, alkyl of 1 to 6 carbon atoms, phenyl, optionally substituted at any one position with an alkyl group of 1 to 6 carbon atoms, and benzyl, optionally substituted at any one position of the phenyl group with an alkyl group of 1 to 6 carbon atoms.

Examples of anodic electrochromic materials may include, di-tert-butyl-diethylferrocene, 5,10-dimethyl-5,10-dihydrophenazine, 3,7,10-trimethylphenothiazine, 2,3,7,8-tetramethoxythianthrene, 10-methylphenothiazine, or mixtures thereof. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, of the like.

In one embodiment, at least one of the anodic compounds includes a substituted or unsubstituted electroactive phenazine compound. In another embodiment, at least one of the anodic electroactive material includes a substituted or unsubstituted 2,7-dialkyl-5,10-dialkyl-5,10-dihydrophenazine compound. In another embodiment, at least one alkyl group of the 5,10-dialkyl includes at least four carbon atoms and is void of any (3 hydrogen atoms, and at least one alkyl group of the 2,7-dialkyl includes at least four carbons. In another embodiment, at least one alkyl group of the 5,10-dialkyl includes a substituted or unsubstituted neopentyl group, and at least one alkyl group of the 2,7-dialkyl includes a substituted or unsubstituted neopentyl, isobutyl, 2-ethylbutyl, 2-methylbutyl, 2-ethylhexyl, or 2-propylpentyl. In another embodiment, at least one alkyl group of the 5,10-dialkyl includes a neopentyl group, and at least one alkyl group of the 2,7-dialkyl includes an isobutyl group. The electrochromic medium may also include a mixture of 2,7- and 2,8-phenazine isomers.

The cathodic compound may be present in the ionically conducting phase of the electrolyte 114, at 25° C., at a concentration of at least $10^{-4}$ M up to its solubility, but more usually between about 0.01 M and 0.1 M, as determined by standard voltammographic techniques. Similar amounts of the anodic compound may be present in the ionically conducting phase of the electrolyte 114.

It is believed that the molar extinction coefficients of the anodic compounds and cathodic compounds in the EC device 100 change as a function of wavelength, with their electrochemical oxidation and reduction, respectively. Generally, at least one of these compounds undergoes a significant change in extinction coefficient at wavelengths in the visible range upon the oxidation or reduction when a potential difference is applied between the electrodes 110, 114. In the electrolyte 114, it is believed that the oxidized anodic compounds react substantially only with the reduced cathodic compounds to yield substantially only anodic compounds and cathodic compounds in their forms and with their properties prior to the oxidations and reductions, respectively.

The transmittance and/or color change of the electrolyte 114 may occur rapidly at room temperature. For example, the electrolyte 114 may have a bright to dark state switching time of about 30 seconds or less, such as within about 25 seconds, within about 20 seconds, or within about 15 seconds, of the application of the potential difference, at room temperature. The electrolyte 114 may have a similar dark to bright state switching time.

Accordingly, the inclusion of the organic electrochromic compounds in the electrolyte allows for the EC device 100 to rapidly change transmittance (e.g., have a short switching time). In addition, the electrolyte 114 may be self-erasing, in that it does not require the application of an inverse potential difference to assume the bright state.

The application of a potential difference may also result in a change in transmittance of one or both of the electrodes 110 and 112. For example, a potential difference may result in the oxidation or reduction of the metal oxides of one or both of the electrodes 110 and 112. For example, the working electrode 110 may change from a bright state to a dark state in from about 1 minute to about 5 minutes, such as from about 2 minutes to about 3 minutes. The working electrode 110 may change from the dark state to the bright state in a similar amount of time, when an inverse potential difference is applied between the electrodes 110 and 112.

Accordingly, the organic electrochromic compounds of the electrolyte 114 change transmittance in a relatively short amount of time, and assume a bright state when no potential difference is applied between the electrodes 110, 112. In contrast, the electrochromic metal oxides of at least the working electrode 110 change transmittance in a relatively longer amount of time, but maintain transmittance even when no potential difference is applied.

Methods

Figure 2:
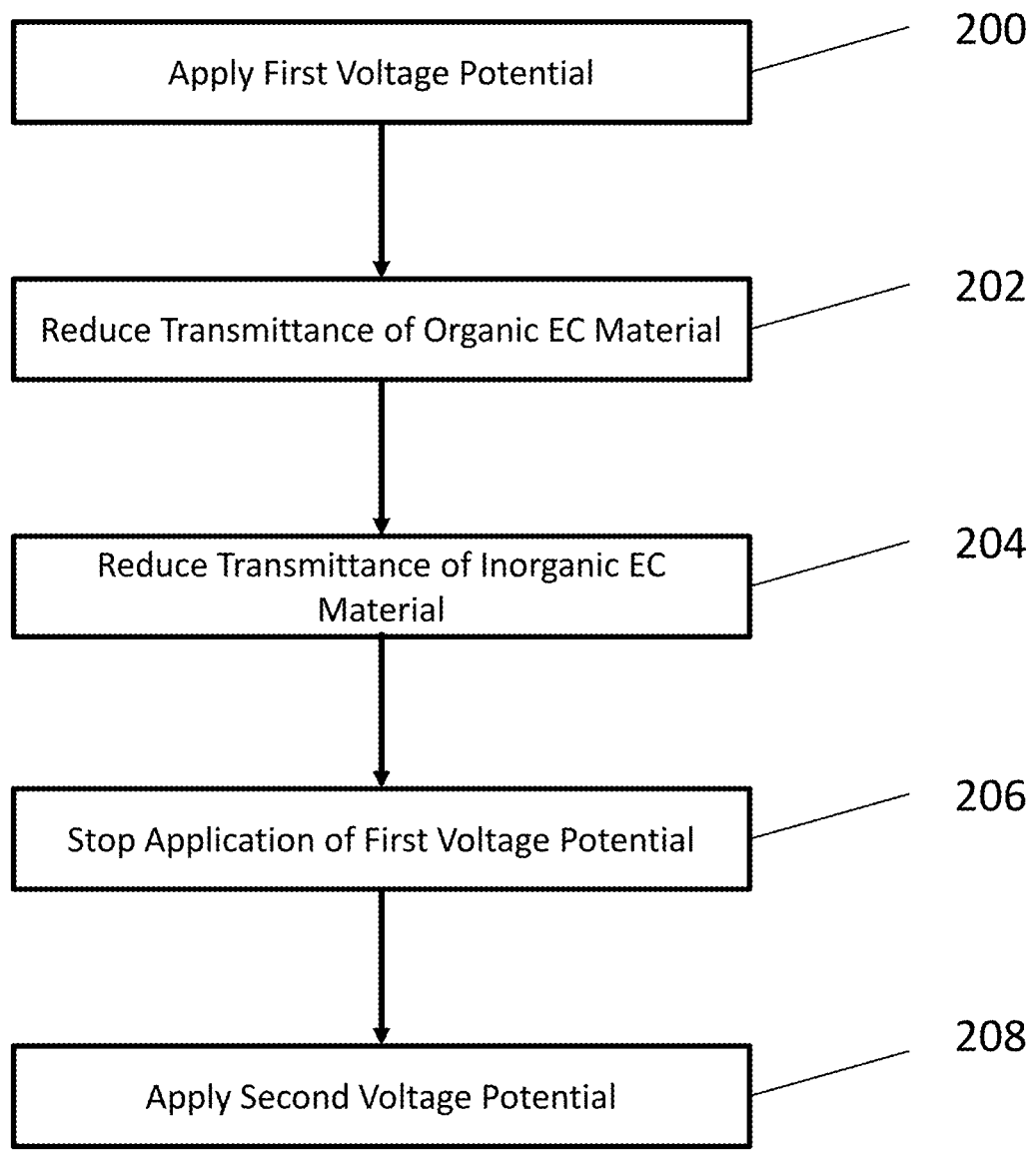
FIG. 2 is a block diagram illustrating a method of using an EC device, according to various embodiments of the present disclosure.

FIG. 2 is a block diagram illustrating a method of using an EC device, according to various embodiments of the present disclosure. Referring to FIGS. 1 and 2, the method may be performed using an EC device, such as the EC device 100 of FIG. 1.

In step 200, the method may include supplying power to the EC device 100 such that a first voltage potential difference is formed between the working and counter electrodes 110, 112. For example, the first voltage potential difference may range from about 1 volt to about 1.4 volts.

In step 202, as a result of the first voltage potential difference, the transmittance of the EC device 100 may rapidly decrease, due to the oxidation and/or reduction of the electrochromic organic compounds included in the electrolyte 114. In other words, the EC device 100 may rapidly assume a dark state due to the darkening of the organic compounds of the electrolyte 114. For example, the organic compounds may assume a dark state within a first time period ranging from about 15 seconds to about 1 minute, such as from about 20 seconds to about 40 seconds, or from about 25 seconds to about 35 seconds.

In step 204, the transmittance of the inorganic electrochromic material of the EC device 100 may be reduced, as a result of the continued application of the first voltage potential difference. The voltage magnitude may be changed (e.g., increased or decreased) between steps 202 and 204 if the inorganic electrochromic material requires a different voltage to switch from the bright to dark state than the organic electrolyte electrochromic material. For example, the metal oxide nanoparticles 144 may assume a dark state within a second time period ranging from about 1 minute to about 5 minutes, such as from about 2 minutes to about 4 minutes.

In step 206, the supply of power to the EC device 100 may be stopped, such that a voltage potential difference of about 0 volts may be applied between the working and counter electrodes 110, 112. Without an applied voltage potential difference, the organic compounds may be reduced and/or oxidized, such that the transmittance of the organic electrochromic material is increased. In other words, the organic material of the electrolyte 114 may assume a bright state. However, since metal oxide nanoparticles may remain in the dark state, the EC device may remain in the dark state (e.g., the visible light transmittance of the EC device may remain low). Therefore, the EC device 100 may maintain a dark state, without an applied voltage potential difference.

In step 208, the method may further include applying a second voltage potential difference between the working and counter electrodes 110, 112. The second voltage potential difference may be the inverse (e.g., opposite polarity) of the first voltage potential difference. As a result, the metal oxide nanoparticles may be oxidized, such that the EC device 100 assumes a bright state.

According to various embodiments of the present disclosure, a hybrid EC device may be provided that offers rapid switching between bright and dark state switching. Further, the EC device may maintain a dark state even after power is no longer supplied to form a voltage potential difference. As such, the EC device may be used in a wide variety of applications, such as in vehicle windows (including sunroofs, side windows, rear windows and/or windshields), architectural facades (e.g., building windows), roof glazing (skylights, canopies, etc.), and appliances. For example, in vehicles, such as automobiles, both fast switching and low power consumption is desired. The embodiment EC device may be switched to the dark state even when the vehicle is powered off, using power from the vehicle battery. Since the battery power is used only while the working electrode is switching to the dark state, continuous use of battery power to maintain the organic electrochromic electrolyte in the dark state is not required. Thus, the vehicle window (e.g., sunroof) can remain in the dark state for several hours to several days while the vehicle is powered off without using the battery power (e.g., without draining the battery) after the initial switching of the hybrid electrochromic device working electrode to the dark state.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic (EC) device comprising:
a transparent substrate;
a working electrode disposed on the substrate and comprising electrochromic inorganic nanoparticles;
a counter electrode; and
an electrolyte disposed between the working electrode and the counter electrode, the electrolyte comprising an electrochromic organic material;
wherein the working electrode further comprises a flux material having a melting point ranging from about 25° C. to about 500° C., the flux material configured to prevent sintering of the nanoparticles at a temperature of up to about 700° C.; and
wherein the flux material comprises a lithium-rich anti-perovskite (LiRAP) material represented by the formula $Li_3OX$, wherein X is F, Cl, Br, I, or any combination thereof.

2. An electrochromic (EC) device comprising:
a transparent substrate;
a working electrode disposed on the substrate and comprising electrochromic inorganic nanoparticles;
a counter electrode; and
an electrolyte disposed between the working electrode and the counter electrode, the electrolyte comprising an electrochromic organic material;
wherein the counter electrode comprises:
a passive layer disposed on the electrolyte and comprising passive nanoparticles and a flux material; and
a complementary layer disposed on the passive layer and comprising complementary nanoparticles and a matrix comprising a lithium metal oxide;
wherein in the passive layer:
the passive nanoparticles comprise $CeO_2$ nanoparticles and $In_2O_3$ nanoparticles; and
the flux material comprises a lithium-rich anti-perovskite (LiRAP) material represented by the formula $Li_3OX$, wherein X is F, Cl, Br, I, or any combination thereof.

3. An electrochromic (EC) device comprising:
a transparent substrate;
a working electrode disposed on the substrate and comprising electrochromic inorganic nanoparticles;
a counter electrode; and
an electrolyte disposed between the working electrode and the counter electrode, the electrolyte comprising an electrochromic organic material;
wherein the counter electrode comprises:
a passive layer disposed on the electrolyte and comprising passive nanoparticles and a flux material; and
a complementary layer disposed on the passive layer and comprising complementary nanoparticles and a matrix comprising a lithium metal oxide;
wherein the complementary layer further comprises a flux material comprising a lithium-rich anti-perovskite (LiRAP) material represented by the formula $Li_3OX$, wherein X is F, Cl, Br, I, or any combination thereof.

* * * * *